(12) United States Patent
Mullaney et al.

(10) Patent No.: US 7,780,173 B2
(45) Date of Patent: Aug. 24, 2010

(54) SEALING ASSEMBLIES AND METHODS FOR SEALING AN ELONGATE MEMBER

(75) Inventors: Julian Mullaney, Raleigh, NC (US); David Ray Radliff, Holly Springs, NC (US)

(73) Assignee: Tyco Electronics Corporation, Middletown, PA (US)

( * ) Notice: Subject to any disclaimer, the term of this patent is extended or adjusted under 35 U.S.C. 154(b) by 645 days.

(21) Appl. No.: 11/685,112

(22) Filed: Mar. 12, 2007

(65) Prior Publication Data

US 2008/0224419 A1    Sep. 18, 2008

(51) Int. Cl.
*H02G 15/04* (2006.01)
*H02G 15/013* (2006.01)

(52) U.S. Cl. .................... 277/621; 277/615; 277/618; 277/619; 277/622; 174/77 R

(58) Field of Classification Search .............. 277/522, 277/525, 618, 615, 622, 621, 619; 174/155, 174/77 R
See application file for complete search history.

(56) References Cited

U.S. PATENT DOCUMENTS

| 2,912,266 | A | * | 11/1959 | Nordell | ................. | 277/520 |
| 3,141,686 | A | * | 7/1964 | Smith et al. | ................. | 277/608 |
| 3,828,118 | A | * | 8/1974 | Bushek et al. | ............. | 174/11 R |
| 4,267,401 | A | * | 5/1981 | Wilkinson | ................. | 174/77 R |
| 4,296,806 | A | * | 10/1981 | Taylor et al. | ................. | 166/120 |
| 4,317,573 | A | * | 3/1982 | Karkkainen | ................. | 277/510 |
| 4,332,393 | A | * | 6/1982 | Cuschera | ................. | 277/606 |
| 4,901,987 | A |  | 2/1990 | Greenhill et al. | | |
| 5,210,374 | A | * | 5/1993 | Channell | ................. | 174/38 |

(Continued)

FOREIGN PATENT DOCUMENTS

DE    84 32 321 U1    2/1986

(Continued)

OTHER PUBLICATIONS

FOSC-500-AA Installation Instruction: Cold Applied Inline Splice Closure for Small Fiber Optic Cables (maximum 48 splices), Tyco Electronics Corporation © 2007, 12 pages.

(Continued)

*Primary Examiner*—Alison K Pickard
(74) *Attorney, Agent, or Firm*—Myers Bigel Sibley & Sajovec, PA

(57) ABSTRACT

A sealing assembly for forming a seal about an elongate object includes a resilient seal member and a loading mechanism. The resilient seal member includes an inner wall surface defining a channel to receive the elongate object. The seal member has first and second opposed sides. The loading mechanism includes a first pressure member on the first side of the seal member; a second pressure member on the second side of the seal member; a biasing member on the second side of the seal member and interposed between the seal member and the second pressure member; and an adjustable displacement mechanism accessible and operable from the first side of the seal member to displace the first and second pressure members relative to one another to selectively apply a compressive load to the seal member such that the inner wall surface is expanded inwardly to exert a sealing pressure on the elongate object.

19 Claims, 9 Drawing Sheets

U.S. PATENT DOCUMENTS

| | | | | |
|---|---|---|---|---|
| 5,235,138 | A | * | 8/1993 | Shah et al. .................. 174/151 |
| 5,236,227 | A | * | 8/1993 | Adams et al. ................. 285/27 |
| 5,313,019 | A | * | 5/1994 | Brusselmans et al. ......... 174/93 |
| 5,538,261 | A | * | 7/1996 | Murray et al. ............... 277/606 |
| 5,662,336 | A | * | 9/1997 | Hayashi et al. ............. 277/607 |
| 6,036,541 | A | * | 3/2000 | Koumatsu ................... 439/587 |
| 6,046,406 | A | * | 4/2000 | Milanowski et al. ...... 174/77 R |
| 6,062,570 | A | * | 5/2000 | Erickson ..................... 277/529 |
| 6,071,148 | A | * | 6/2000 | Radliff et al. ............... 439/587 |
| 6,521,840 | B1 | * | 2/2003 | Kreutz ........................ 174/151 |
| 6,875,926 | B2 | * | 4/2005 | Buekers et al. .............. 174/100 |
| 7,015,394 | B2 | * | 3/2006 | Desard et al. ............... 174/100 |
| 2004/0080119 | A1 | * | 4/2004 | Goll ............................ 277/607 |
| 2006/0261560 | A1 | | 11/2006 | Radliff et al. |
| 2009/0200745 | A1 | * | 8/2009 | Lyon ........................... 277/314 |

FOREIGN PATENT DOCUMENTS

| | | |
|---|---|---|
| DE | 10020493 A1 | 11/2001 |
| EP | 1195856 A2 | 4/2002 |
| EP | 1195856 A3 | 4/2002 |
| JP | 03139113 | 6/1991 |
| WO | WO 2006/118747 A1 | 11/2006 |

OTHER PUBLICATIONS

International Search Report and Written Opinion (20 pages) corresponding to International Application No. PCT/US2008/002960; Mailing Date: Aug. 10, 2008.

Bracket Mounted Terminal—BMT Approved by SBC Engineering/Ordering Guide, Jul. 2004, 7 pages.

Bracket Duct Plugs, Duct Plugs/Sealing Devices for Ducted Cable Networks, © 2001 Tyco Electronics Corporation, 2 pages.

Channell , Bracket Mounted Terminal (BMT™) Series, Telecom Closure Products, 2 pages.

Coyote® Dome Closure—The Evolution of a Breed Continues brochure, © 2004 Preformed Line Products, 4 pages.

Coyote® Dome Closure End Plate Grommet, May 2004, © 2004 Preformed Line Products, 2 pages.

Fiber Optic Simplex Plug, Sealing Plugs for Small Diameter Ducts, © 2001 Tyco Electronics Corporation, 2 pages.

FOSC 400, Fiber Optic Splice Closures, 4 pages.

FOSC 400 A8, Fiber Optic Splice/Tap/Drop Closure, © 2003 Tyco Electronics Corporation, 2 pages.

Minitube Sealing System, Sealing Devices for Minitubes Installations in Duct Networks, © 2004 Tyco Electronics Corporation, 2 pages.

Photographs of Gel Block of Tyco Electronics FOSC 450 Fiber Optic Gel Splice Enclosure, admitted prior art, 15 pages.

Smalley Steel Ring Company, Crest-to-Crest Springs Brochure, 6 pages.

Tyco Electronics Corporation, FOSC 450, Fiber Optic Gel Splice Closures, 2001, 2 pages.

Tyco Electronics Corporation, FOSC 450, Fiber Optic Splice Closure Ordering Guide, 2004, 26 pages.

Tyco Electronics Corporation, FOSC 450 D Closure Installation Instruction: Fiber Optic Splice Closure, 2003, 26 pages.

U.S. Appl. No. 11/119,998, filed May 2, 2005, titled "Sealing Assemblies and Methods for Sealing an Elongate Member," published as US Publication No. 2006/0261560 A1 on Nov. 23, 2006.

* cited by examiner

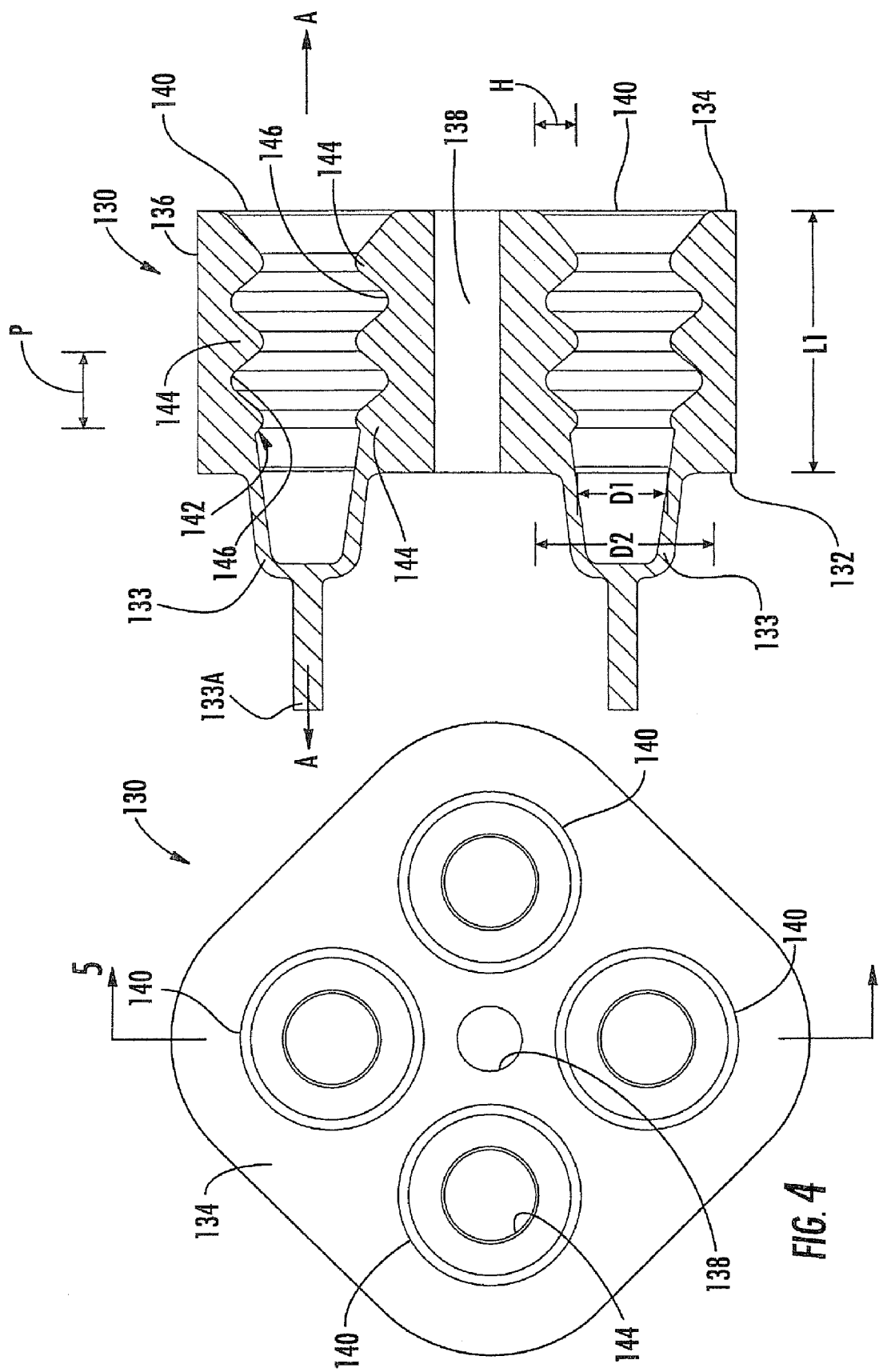

SEALING ASSEMBLIES AND METHODS FOR SEALING AN ELONGATE MEMBER

FIELD OF THE INVENTION

The present invention relates to sealing devices and, more particularly, to sealing devices for providing a seal between an opening in an object and an elongate article such as a cable.

BACKGROUND OF THE INVENTION

It is often necessary to form a seal between an elongate object such as a cable and an opening in an object such as a pipe or splice enclosure. For example, in a telecommunications infrastructure, electrical connectors or splices may be housed in enclosures to protect them from harsh environments. It may be necessary or desirable to seal the enclosure against in the ingress of water of the like. In particular, the enclosure may be provided with a sealing device to form a seal about each cable or wire at its entry into the enclosure.

SUMMARY OF THE INVENTION

According to embodiments of the present invention, a sealing assembly for forming a seal about an elongate object includes a resilient seal member and a loading mechanism. The resilient seal member includes an inner wall surface defining a channel to receive the elongate object. The seal member has first and second opposed sides. The loading mechanism includes: a first pressure member one the first side of the seal member; a second pressure member on the second side of the seal member; a biasing member on the second side of the seal member and interposed between the seal member and the second pressure member; and an adjustable displacement mechanism accessible and operable from the first side of the seal member to displace the first and second pressure members relative to one another to selectively apply a compressive load to the seal member such that the inner wall surface is expanded inwardly to exert a sealing pressure on the elongate object.

According to further embodiments of the present invention, a sealing assembly for forming a seal about an elongate object includes a resilient seal member, a base member, and a loading mechanism. The resilient seal member includes an inner wall surface defining a channel to receive the elongate object. The seal member has first and second opposed sides. The base member is disposed on the second side of the seal member. The loading mechanism includes: a first pressure member on the first side of the seal member; a second pressure member on the second side of the seal member and including a threaded portion; a biasing member on the second side of the seal member and interposed between the base member and the second pressure member; and an adjustable displacement mechanism including a threaded member that threadedly engages the threaded portion of the second pressure member and is rotatable with relative to the base member and the second pressure member to axially displace the first and second pressure members relative to one another to selectively apply a compressive load to the seal member such that the inner wall surface is expanded inwardly to exert a sealing pressure on the elongate object. The sealing assembly further includes an anti-rotation feature to limit rotation of the second pressure member relative to the base member while permitting relative axial displacement between the base member and the second pressure member.

According to further embodiments of the present invention, a sealing assembly for forming a seal about an elongate object includes a resilient seal member and a loading mechanism. The resilient seal member includes an inner wall surface defining a channel to receive the elongate object. The loading mechanism is adapted to selectively apply a compressive load to the seal member such that the inner wall surface is expanded inwardly to exert a sealing pressure on the elongate object. The loading mechanism includes a crest to crest continuous wave spring to apply a compressive biasing load to the seal member.

According to further embodiments of the present invention, a sealing assembly for forming a seal about an elongate object includes a resilient sealing member and a loading mechanism. The resilient seal member includes an inner wall surface defining a channel to receive the elongate object. The seal member is formed of a material having a durometer of at least as hard as about 10 Shore A. The loading mechanism is adapted to selectively apply a compressive load to the seal member such that the inner wall surface is expanded inwardly to exert a sealing pressure on the elongate object. The loading mechanism includes a biasing mechanism adapted to apply a compressive biasing load to the seal member.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 4 is a rear plan view of a seal member forming a part of the enclosure assembly of FIG. 1;

FIG. 5 is a cross-sectional view of the seal member of FIG. 4 taken along the line 5-5 of FIG. 4;

DETAILED DESCRIPTION OF THE EMBODIMENTS OF THE INVENTION

Figure 1:
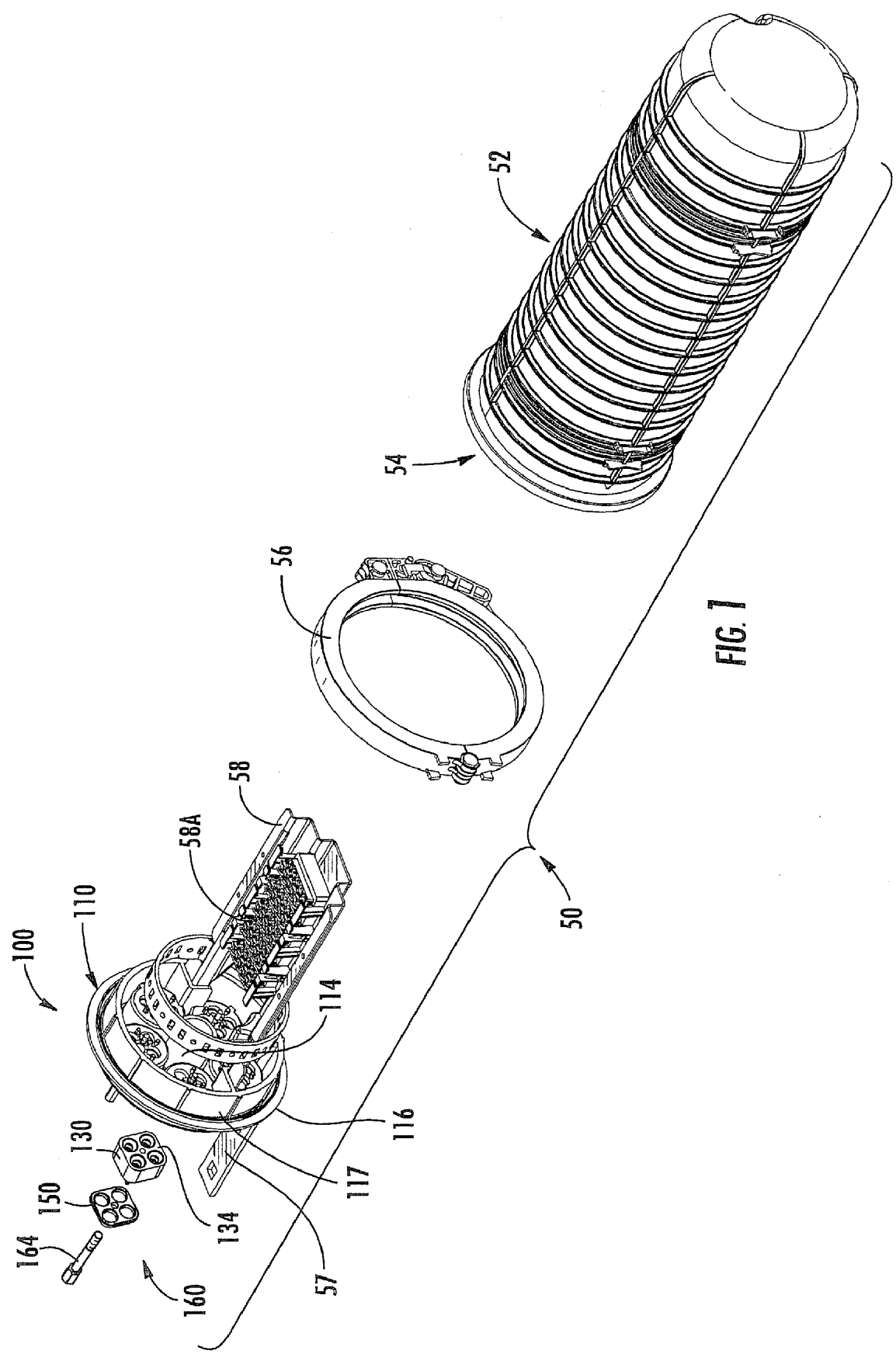
FIG. 1 is an exploded, rear perspective view of an enclosure assembly according to embodiments of the present invention.

The present invention now will be described more fully hereinafter with reference to the accompanying drawings, in which illustrative embodiments of the invention are shown. In the drawing, the relative sized of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected " to another element, there are no intervening elements present. Like numbers refer to like elements throughout. As used herein the term "and/or" includes any and all combinations of one or more of the associated listed items. Well-known functions or constructions may not be described in detail for brevity and/or clarity.

In addition, spatially relative terms, such as "under", "below", "lower", "over", "upper" and the like, may be used herein for ease of description to describe one element or features'relationship to another elements(s) or feature(s) as illustrate in the figures. It will be understood that the spatially relative terms are intended to encompass different orientations of the device in use or operation in addition to the orientation depicted in the figures. For example, if the device in the figures is turned over, elements described as "under"or "beneath" other elements or features would then be oriented "over" the other elements or features. Thus, the exemplary term "under" can encompass both and orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention, As used herein, the singular forms "a", "an" and "the" are intended to include the plural forms as well, unless the context clearly indicates otherwise. It will be further understood that the terms "comprises"and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by on of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference to FIGS 1-9, a sealing assembly 100 according to embodiments of the present invention is shown therein. The sealing assembly 100 may for a part of an enclosure assembly 50 to form a seal or seals between one or more elongate objects, such as a cable 10 (FIG. 7), and the enclosure assembly 50. As discussed in more detail below, the sealing assembly 100 may server to provide a consistent, reliable and effective seal against ingress of water and other contaminants into the enclosure assembly 50. Moreover, the sealing assembly 100 nay be adapted to accept and effectively seal about an expanded range of sizes of cables 10, and may be customizable to fit a variety of cable sizes.

Figure 2:
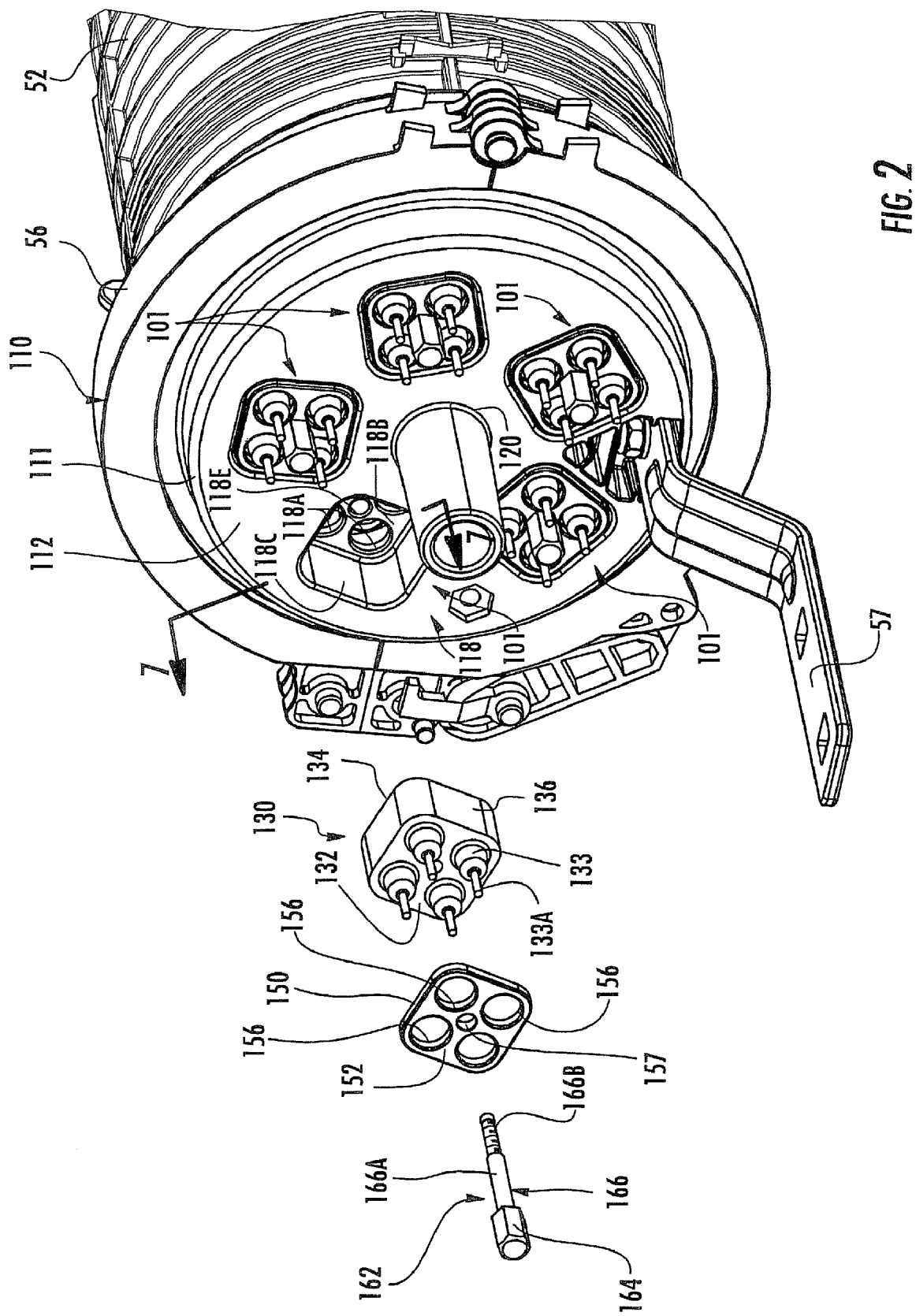
FIG. 2. is an enlarged fragmentary, front perspective view of the enclosure assembly of FIG. 1.
Figure 3:
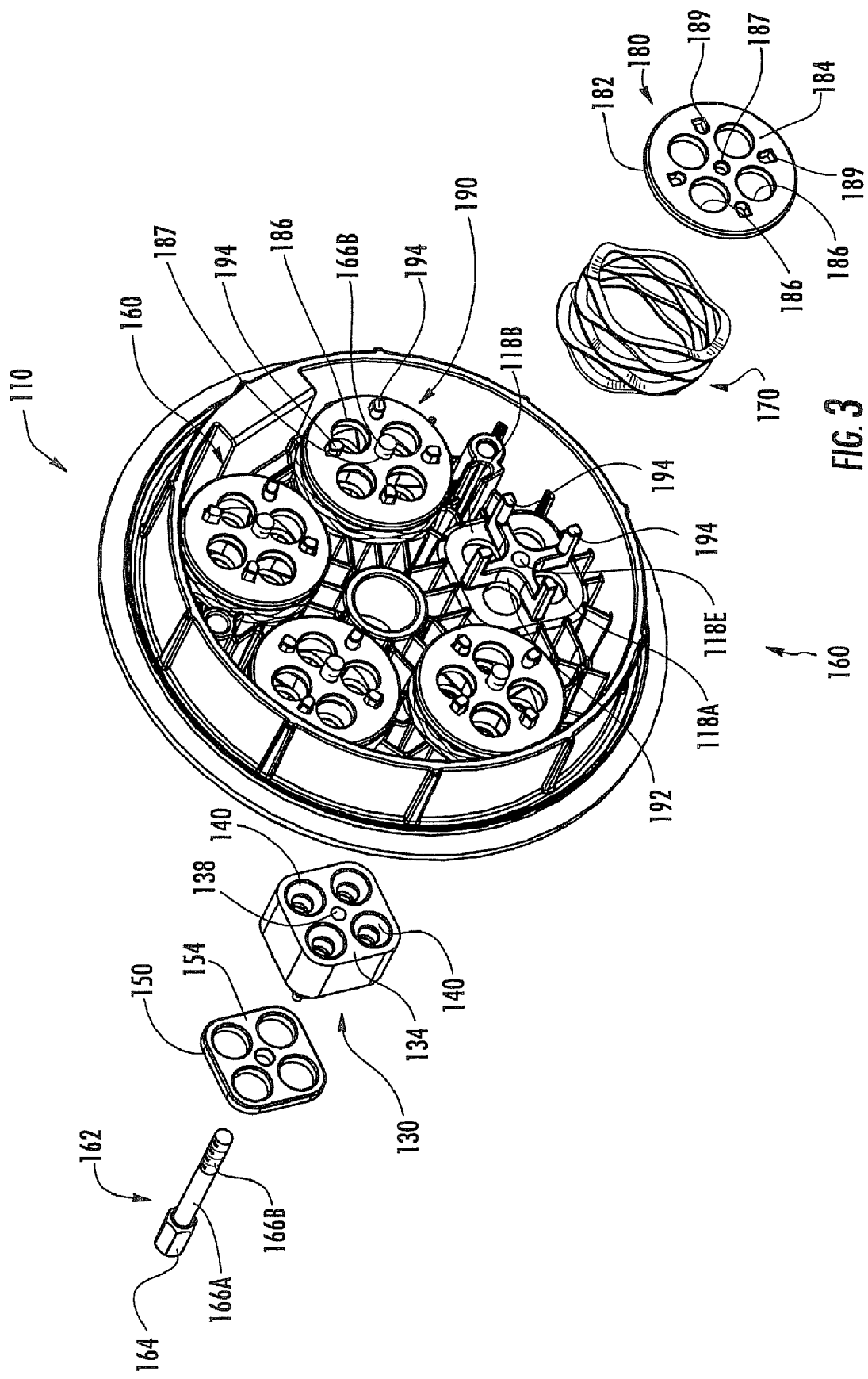
FIG. 3 is an exploded, rear perspective view of a sealing assembly forming a part of the enclosure assembly of FIG. 1.

The sealing assembly 100 includes a housing member or base member 110, a plurality of resilient seal members 1130, and a plurality of loading mechanism 160 (FIGS. 2 and 3). The base member 110, the seal members 130 and the loading mechanisms 160 form five sealing subassemblies 101.

With reference to FIGS. 1 and 2, the base member 110 includes a body 111 having a front side 112 (FIG. 2) and a rear side 114 (FIG. 1). Five cavities 118 (FIG. 2) are defined in the front side 112 and each forms a part of respective one of the sealing subassemblies 101. Each cavity 118 is defined by a bottom wall 118B and a polygonal (as shown, square) side wall 118C. Four conductor openings 118A and a central opening 118E are formed in each bottom wall 118B. A further opening 120 is also defined in the body 111. An annular flange 116 (FIG. 1) extends radially outwardly from the body 111 and an annular flange 117 (FIG 1) extends forwardly form the body 111.

The base member 110 may be formed of any suitable material . According to some embodiments, the base member 110 is a molded polymeric material. Suitable polymeric materials include polyolefins (e.g., polyethylene, polypropylene and copolymers thereof), acrylonitrile butadiene styrene copolymers (ABS), polybutylene terephthalate, nylon, polycarbonate, polyvinyl chloride and alloys or combinations of the aforementioned polymers or similar engineering polymers.

With reference to FIGS. 1-5, a respective seal member 130 is positioned in each cavity 118. The seal members 130 are formed of a resilient, pliable, deformable material. According to some embodiments, the seal members 130 are formed of polymeric material. According to some embodiments, the seal members 130 are formed of an elastomeric material. According to some embodiments, the seal members 130 are formed of a rubber material. According to some embodiments, the seal members 130 are formed of silicone rubber. Other suitable materials may include polyurethane, chlorinated rubber, natural rubber, thermoplastic vulcanates (TPVs), nitrile rubber, ethylene propylene diene terpolymers (EPDM), silicone modified EPDM, fluoroelasomers, polyvinyl chloride, thermoplastic elastomers (e.g., polyolefins, polyesters or others), styrenic block copolymers and ethylene acrylic elastomers. The material of the seal members 130 ay be self-lubricating According to some embodiments, the material of the seal members 130 has a durometer at least as hard as 10 Shore A. According to some embodiments, the material of the seal members 130 has a durometer no harder than 70 Shore A. According to some embodiments, the durometer is between about 20 and 40 Shore A.

The seal members 130 may be of unitary construction as illustrated. As illustrated, the seal members 130 are substantially identical and one will be described hereinafter, it being appreciated that the description that follows applies equally to the remaining seal members 130. However, according to further embodiments, the seal members 130 may differ from one another in material and/or configuration.

Referring now to FIGS. 4 and 5, the seal member 130 has a first side 132, an opposing rear side 134, and a polygonal (as shown, square) outer surface 136. Four spaced apart passages or channels 140 extend axially through the seal member 130 each along a respective longitudinal axis A-A (FIG. 7) from the front side 132 to the rear side 134 and are defined by respective inner wall surfaces 142. A central hole 138 also extends axially through the seal member 130. The channels 140 and the central hole 138 are laterally spaced apart. An integral cap 133 is disposed on the front side 132 over each channel 140. Each cap 133 includes an integral pull tab 133A.

The outer dimension D3 (FIG. 7) of the seal member 130 is less than the inner dimension D5 (FIG. 7) of the corresponding cavity 118. According to some embodiments, the outer dimension D3 is between about 0.10 and 0.14 inch less than the inner dimension D5.

The channel 140 may be substantially identical or different. Referring to FIG. 5, each inner wall surface 142 includes a plurality of annular baffles or ribs 144 and a plurality of annular voids or troughs 146 alternatingly and serially arranged along the longitudinal axis A-A of the channel 140. Thus, as shown in FIG. 4, the inner wall surface 142 presents an undulating surface when viewed in cross-sectional profile. According to some embodiments, the profile is generally sinusoidal. According to some embodiments, the ribs 144 and the troughs 146 are substantially mirror images of one another as illustrated.

According to some embodiments, the pitch P (FIG. 5) between the ribs 144 is at least about 0.15 inch. According to some embodiments, the pitch P is between about 0.15 and 0.30 inch.

According to some embodiments, the depth H (FIG. 5) of each trough 146 (which is also the height of each rib 144) is at least about 0.05 inch and 0.15 inch.

According to some embodiments, the inner diameter D1 (FIG. 5) of each rib 144 is at least about 0.25 inch. According to some embodiments, the diameter D1 of each rib 144 is between about 0.25 and 0.285 inch. According to some embodiments, the diameter D1 of each rib 144 is less than the diameter D4 (FIG. 8) of the smallest cable (or other elongate object) in the prescribed range of cables for which the channel 140 is intended. In addition and in accordance with some embodiments, the diameter D2 (FIG. 5) of the trough 146 is larger than the diameter D4 (FIG. 8) of the largest cable (or other elongate object) in the prescribed range of cables. According to some embodiments, the diameter D1 is between about 0.010 and 0.020 inch smaller than the diameter D4 of the smallest cable and the diameter D2 is between about 0.03 and 0.05 inch larger than the diameter D4 of the largest cable.

According to some embodiments, the length L1 (FIG. 5) of each channel 140 is at least about 0.7 inch. According to some embodiments, the length L1 of each passage 140 is between about 0.7 and 1.5 inch.

Each of the sealing subassemblies 101 includes a loading mechanism 160 (FIG. 3) associated with the corresponding cavity 18 and seal member 130. Each loading mechanism 160 includes a first pressure plate or member 150, a compression bolt 162, a biasing member 170, and a second pressure or member 180 (also referred to herein as the "spring plate 180"). An anti-rotation feature 190 is associated with each loading mechanism 160.

The pressure member 150 (FIGS. 2 and 3) has a front side 152 and a rear side 154. Spaced apart holes 156 and a center hole 157 extend axially through the pressure member 150. The pressure member 150 is mounted on the front side 132 of the seal member 130 such that the rear side 154 contact the front side 132 and the openings 156 align with respective ones of the channels 140. The channels 140 and the openings 118A, 156 are thus axially aligned to provide respective cable entry ports.

The pressure member 150 may be formed of any suitable material. According to some embodiments, the pressure member 150 is formed of rigid polymeric material. According to some embodiments, the pressure member 150 is formed of stainless steel, aluminum, polymeric materials or glass reinforced polymeric materials such as poly (oxymethylene), polyvinylchloride, polypropylene, nylon, or polybutylene terephthalate. The pressure member 150 may be formed of a molded material.

An X-shaped platform 192 (FIG. 3) is secured to and extends rearwardly form the bottom wall 118B of the base member 110. Four post 194 extend rearwardly from the platform 192. According to some embodiments, the platform 192 and the posts 194 are integrally formed (e.g., integrally molded) with the base member 110.

The biasing member 170 is mounted on the rear side of the bottom wall 118B of the base member 110. According to some embodiments, the biasing member 170 is a spring member. According to some embodiments, the biasing member 170 is an annular crest-to-crest continuous wave spring as shown. An exemplary crest-to-crest continuous wave spring 170 is shown in more detail in FIG. 6. Generally, the spring 170 as illustrated includes a continuous flat strip 174 that is helically wound and undulated such that wave segments in each layer or level are offset. The spring 170 defines an interior opening 172. The spring 170 is positioned on the base member 110 such that the spring 170 surrounds the platform 192 and abuts the rear side of the bottom wall 118B.

According to some embodiments, the spring 170 has a free (i.e., zero load) height L4 in the range of from about 0.5 to 0.7 inch. According to some embodiments, the spring 170 has an inner diameter D7 in the range of from about 1.4 to 1.6 inches. According to some embodiments, the spring 170 has an outer diameter D8 in the range of from about 1.9 to 2.1 inches.

According to some embodiments, the spring 170 has a spring rate of between about 350 to 390 lbs/in.

According to some embodiments, the spring 170 has a load of at least 100 lbs. at 0.3 inch work height.

According to some embodiments, the spring 170 has between about 5 and 7 turns. According to some embodiments, the spring 170 has between about 7 and 11 half waves per turn.

According to some embodiments, the spring 170 has a wire thickness of between about 0.2 to 0.28 inch.

The spring 170 may be formed of any suitable material. According to some embodiments, the spring 170 is formed of a metal such as steel, stainless steel or bronze. The spring 170 may have plain ends (as shown) or shimmed ends.

The spring plate 180 is positioned against the spring 170 opposite the bottom wall 118B. The spring plate 180 has a front side 182 and a rear side 184. Spaces apart holes 186, a center hole 187, and positioning holes 189 extend axially through the spring plate 180. The spring plate 180 is mounted on the rear side of the spring 170 opposite the front side 134 (FIG. 5) of the seal member 130. The rear side 182 contacts the spring 170 and the openings 186 align with respective ones of the channels 140. The channels 140 and the openings 118A, 186 are thus axially aligned to provide respective cable entry ports. According to some embodiments, the center hole 187 is internally threaded. According to some embodiments, the threads are integrally molded into the center hole 187. The posts 194 are slidably received in the positioning holes 189 such that the post 194 and the holes 189 cooperatively serve a the anti-rotation feature.

The spring plate 180 may be formed of any suitable material. According to some embodiments, the spring plate 180 is formed of a rigid polymeric material. According to some embodiments, the spring plate is formed of stainless steel, aluminum, polymeric materials or glass reinforced polymeric materials such as poly(oxymethylene), polyvinylchloride, polypropylene, nylon, or polybutylene terephthalate. The spring plate 180 may be formed of a molded material.

Figure 7:
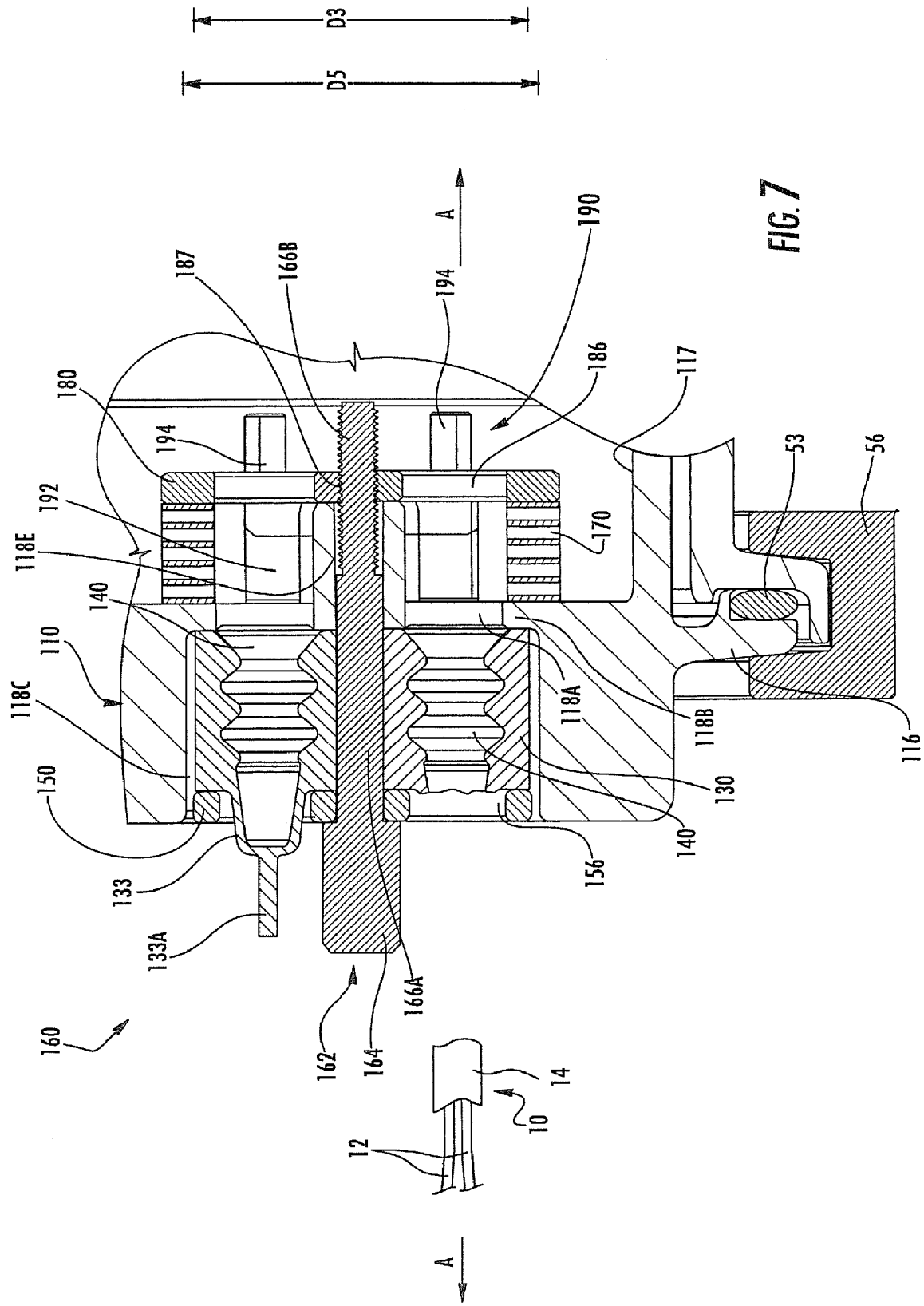
FIG. 7 is a fragmentary, cross-sectional view of the enclosure assembly of FIG. 1 taken along the line 7-7 of FIG. 2.

The bolt 162 includes a head 164 and a shank 166. The shank 166 includes a smooth portion 166A and a threaded portion 166B/ As shown in FIG. 7. the bolt 162 extends through the center hole 157, the central hole 138, the central opening 118E, the spring hole 172, and the center hole 187. The threaded portion 166B threadedly engages the threads of the center hole 187. The diameter of the head 164 is oversized relative to the diameter of the hole 157 such that the head 164 can abut and apply an axially compressive load to the front side 152 of the pressure member 150. The head 164 is positioned on the front side of the sealing assembly 100 so that it is accessible and operable from the front side 132 of the seal member 130.

The bolt 162 may be formed of any suitable material. According to some embodiments, the bolt 162 is formed of a metal such as steel.

According to some embodiments, the diameters of the openings 118A, 156, and 186 are substantially the same as or larger than the diameter D2 (FIG. 5) of the troughs 146 of the corresponding channels 140.

With reference to FIGS. 1-3 and 7, the enclosure assembly 50 may include an upper, domed-shaped housing 52 mountable on the base member 110 to define an internal chamber 54. A support 58 is mounted on the base member 110 and extends up into the chamber 54 when the enclosure assembly 50 is assembled. A bracket 57 extends through and forwardly form the base member 110 for mounting the enclosure assembly 50 on a utility pole or the like. A connector block 58A or the like may be mounted on the support 58 for splicing or grounding wires fed into the chamber 54 through the base member 110. The connector block 58A may include a wiring stub (not shown) that extends through the opening 120 and is sealed therewith by any suitable means. A clamp 56 is provided to secure the housing 52 to the base member 110. An O-ring 53 (FIG. 7) is provided between the housing 52 and the base member 110 (e.g., in a grove in the flange 116) to form a seal between the housing 52 and the base member 110.

As noted above, the enclosure assembly 50 and the sealing assembly 100 may be used with any suitable elongate object, and are particularly contemplated for use with cables such as the cable 10 illustrated in FIG. 7, which is merely exemplary. The cable 10 may be of any suitable type or configuration. For example, the cable 10 may include a plurality of conductors 12 in a jacket 14. The outer surface of the jacket 14 serves as the outer surface of the cable 10. The conductors 12 may be, for example, insulated copper twisted pair wires, optical fibers, a coaxial wire or wires, etc. Alternatively, the cable may be a single insulated or uninsulated wire. The cable 10 may be communications or power transmission cable, for example. The cable 10 has a nominal diameter D4.

The enclosure assembly 50 may be used and assembled in the following manner. The enclosure assembly 50 may be mounted in a pressurized or non-pressurized cabinet, for example. Generally, one or more cable 10 are inserted through the base member 110 as discussed in more detail below. The inserted ends of the cables 10 are connected to a connector block or otherwise terminated or addressed, and the cover 52 is mounted on the base member 110 with the O-ring 53 in place. the clamp 56 is applied about the cover 52 to secure the cover 52 to the base member 110.

FIG. 7 shows a representative sealing member 100 prior to installation of a cable 10. The seal cap 133 of a selected channel 140 of the seal member 130 of the sealing assembly 100 is removed (e.g., by tearing or cutting) to expose the channel 140. Alternatively, the cap 133 may be retained and pierced upon insertion of the cable 10.

Figure 8:
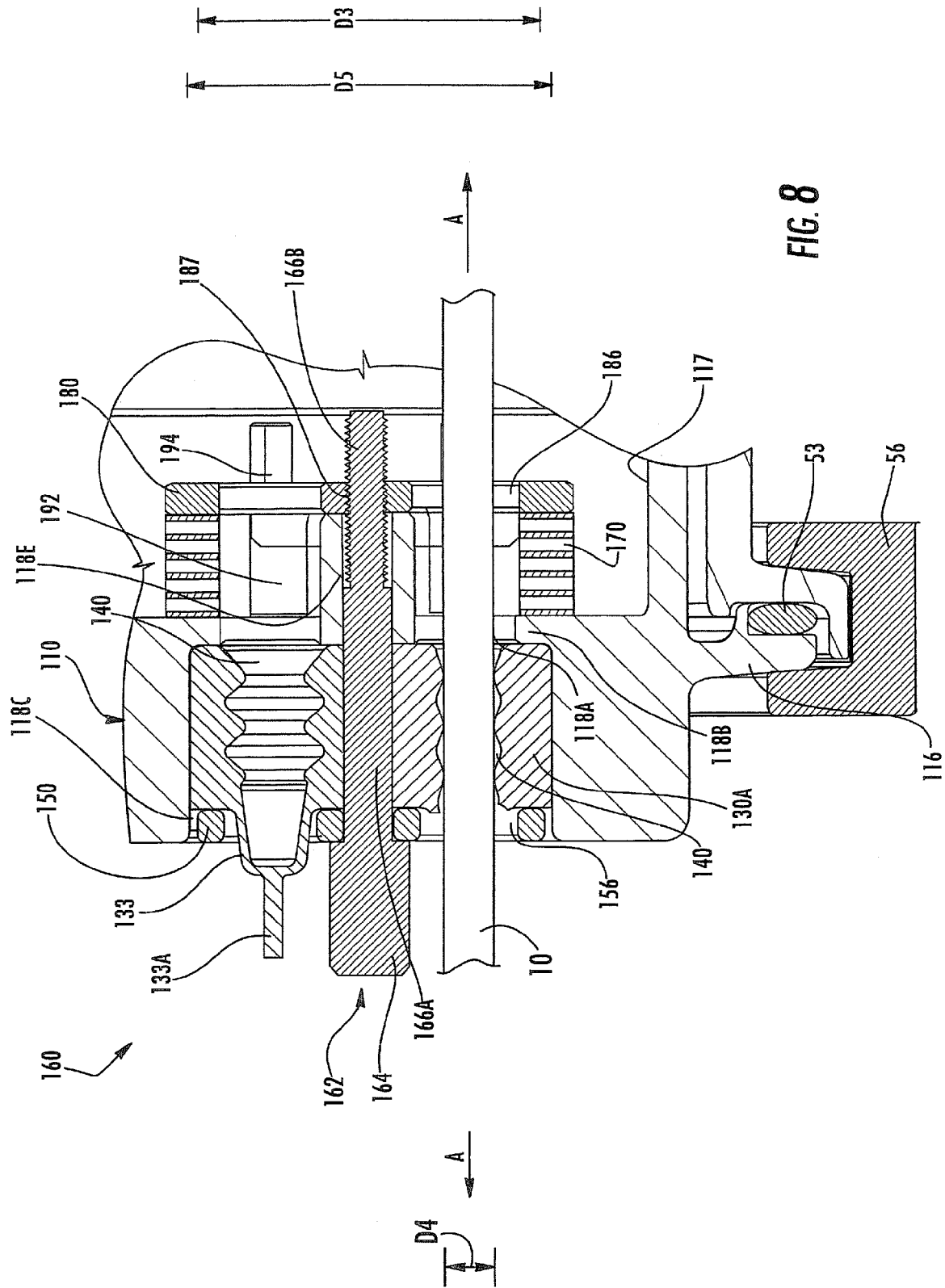
FIG. 8 is a fragmentary, cross-sectional view of the enclosure assembly of FIG. 1 taken along the same line as FIG. 7 and wherein a cable is inserted through a sealing channel thereof.

The cable 10 is then inserted along the axis A-A through the selected channel 140, the aligned pressure member opening 156, the aligned base member opening 118A, the spring hole 172, and the aligned spring plate hole 186 as shown in FIG. 8. Because the diameter D4 of the cable 10 is greater than the diameter D1 of the ribs 144 and the seal member 130 is relativity soft and deformable, the cable 10 contacts the ribs 144 and elastically deforms the seal member 130 into a partly compressed seal member 130A. The ribs 144 are deformed to partially fill the adjacent troughs 146 and the outer diameter of the seal member 130 may be expanded. The cable contact and the seal member deformation may serve to form a sealing engagement or contact between the outer surface of the cable 10 and to retain the cable 10 in place during the subsequent loading operation and/or insertion of additional cable (or other elongate objects) into the seal member 130.

According to some embodiments, the seal member 130 is not loaded by the loading mechanism 160 while the cable 10 is being inserted. Alternatively, the seal member 130 may be partially axially compressed by the loading mechanism 160 while the cable 10 is being inserted.

Figure 9:
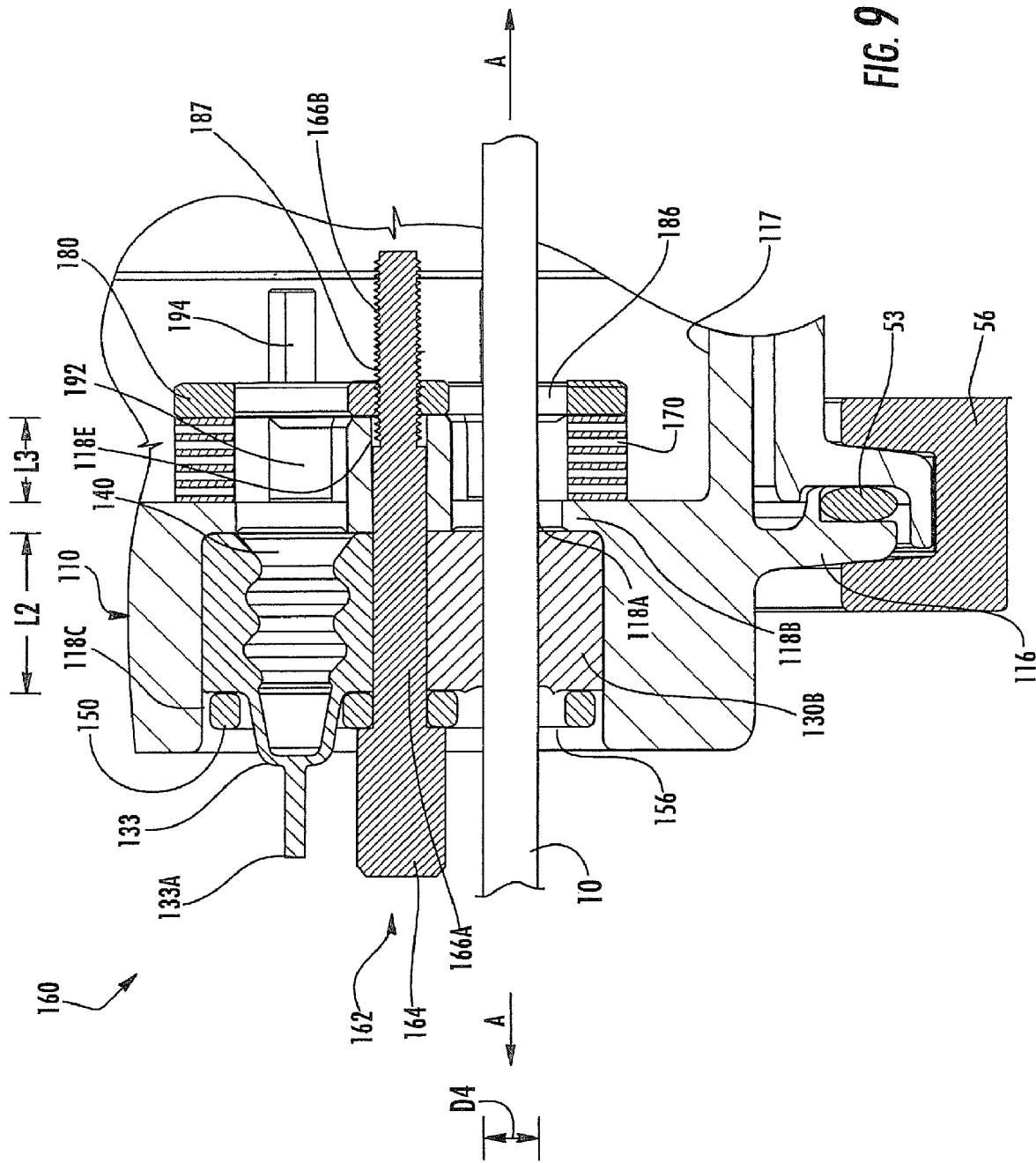
FIG. 9 is a fragmentary, cross-sectional view of the enclosure assembly of FIG. 1 taken along the same line as FIGS. 7 and 8 and wherein a loading mechanism forming a part of the enclosure assembly has been adjusted to compress the seal member about the cable.

Once the cable 10 is in place, the user can access and operate the bolt 162 from the front side of the sealing assembly 100. More particularly, the user can rotate the bolt 162, which cooperates with the treaded spring plate 180 to apply an axial tensioning load that draws or converges the pressure member 150 and the spring plate 180 axially toward one another ant toward the bottom wall 118B as shown in FIG. 9, thereby applying an axially compressive load to the seal member 130A and the spring 170, each of which is interposed or sandwiched therebetween. In this manner, the seal member 130A is axially compressed and further deformed such that the outer surface 136 expands laterally or radially outwardly into sealing engagement with the side wall 118C and the inner surface 142 deforms radially inwardly to seal about outer surface of the cable 10, thereby forming a seal member 130B that is further axially compressed. As a result, the sealing member 130B may exert a sealing pressure around the cable 10 and against the side wall 118C. The total sealing pressure exerted may include the sealing pressure attributable to the oversized cable diameter (as discussed above) as well as the supplemental sealing pressure caused by the axial compression of the seal member 130. The amount of loading of the seal member 130 and thereby the cable 10 by the loading mechanism 160 can be selectively adjusted by operation of the bolt 162.

Additionally, the spring 170 is axially compressed by the rotation of the bolt 162 to a compressed or loaded position as shown in FIG. 9. When the loading mechanism 160 of the sealing assembly 100 is in the compressing position as shown in FIG. 9, the biasing member 170 will store potential energy and continue to apply an axial load to the pressure member 150 via the bolt 162 and thereby to the seal member 130B. In this way, the biasing member 170 may serve to compensate for any relaxation, contraction, etc., in the sealing assembly 100 or the cable 10.

Figure 6:
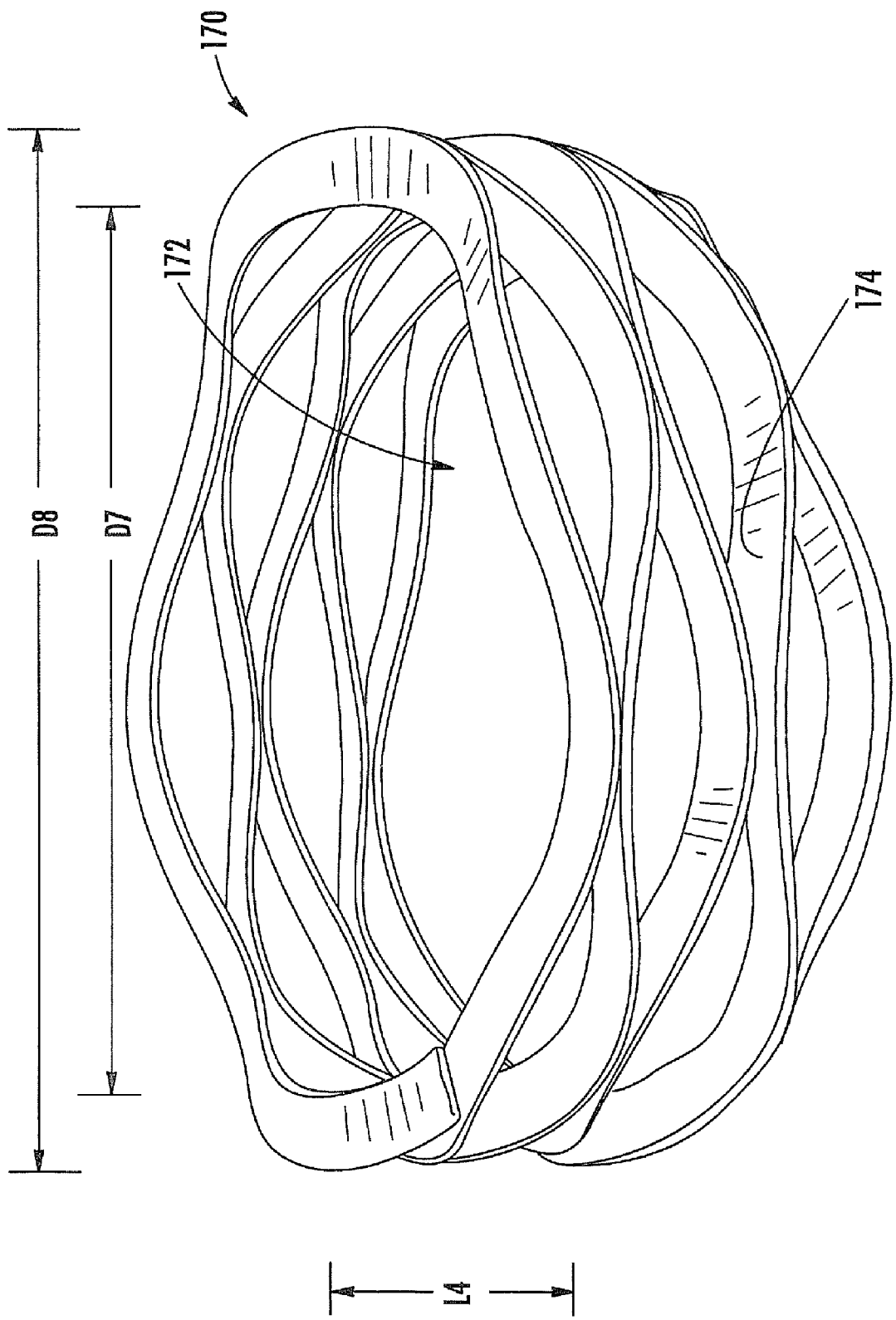
FIG. 6 is a perspective view of a crest to crest continuous wave spring forming a part of the enclosure assembly of FIG. 1.

According to some embodiments, the loading mechanism 160 is adapted to axially compress the spring 170 to a length L3 (FIG. 9) that is less than about 50% of the spring's 170 free height L4 (FIG. 6). According to some embodiments, the loading mechanism 160 is adapted to axially compress the spring 170 at least 0.19 inch and, according to some embodiments, between about 0.19 and 0.29 inch.

The engagements between the polygonal seal member 130, the polygonal pressure member 150, and the complementary polygonal side wall 118C may serve as a limiting or anchoring mechanism to prevent or inhibit rotation of the seal member 130 and the pressure member 150 relative to one another and the base member 110.

One or more additional cables 10 may be inserted through the other channels 140 of the seal member 130 before tightening the loading mechanism 160. When the bold 162 is rotated, each of the channels 140 will simultaneously contract to form a seal about the respective cable 10.

The channel 140 that are not used to receive cables can remain sealed by the caps 133. Alternatively, the channels 140 that are not used to receive cable may be plugged with plug rods, stoppers or the like, which may form seals with the seal member 130 in the same manner as with a cable.

According to some embodiments, the loading mechanism 160 is adapted to provide a load on the seal member 130 of at least about 40 pounds. According to some embodiments, the loading mechanism 160 is adapted to provide a load of between about 40 and 80 pounds. According to some embodiments, the loading mechanism 160 is adapted to axially compress the seal member 130 to a length L2 (FIG. 9) that is less than 90% of the seal members's relaxed length L1 (FIG. 5) and, according to some embodiments, less than 60%.

The threaded arrangement of the bolt 162 and spring plate 180 may allow for a continuous range of adjustment of the compressive load within a prescribed range. The platform 192 may serve to positively limit the adjustment of the loading mechanism 160. Alternatively or additionally, the partial threading of the shank 166 may serve as an adjustment limiter.

Sealing assemblies according to embodiments of the present invention may provide a number of advantages. The relative arrangement of the bold 162, the pressure member 150, the seal member 130, the spring 170 and the spring plate 180 allow for convenient operation of the loading mechanism 160 while also locating the spring 170 internally of the enclosure assembly 50. The relative arrangement may also permit use of the sealing assembly 100 without the spring 170, so that only one set of parts need be manufactured for use with or without spring biasing. This may provide significant cost savings by eliminating the need to manufacture alternate components.

The crest to crest continuous wave spring may provide increased spring force per unit axial deflection as compared to, for example, a coil spring. Thus, the crest to crest continuous wave spring may shorten the compression distance needed to achieve adequate or desired compression force on the seal member 130. This may reduce the number of turns of the bolt 162 required. This may also allow for a small overall axial length of the loading mechanism 160, which may in turn permit a shorter overall length for the enclosure assembly 50.

The anti-rotation feature 190 can allow the foregoing functionality of the loading mechanism 160 (including the floating spring plate 180) without requiring that the operator access and hold the spring plate 180 during installation.

Because the seal member 130 can be subsequently compresses, the channels 140 can be formed of large enough diameter to allow for relatively easy insertion of the cables 10. Cable insertion may also be facilitated by the self-lubricated material of the seal member 130.

A good seal can be formed about each cable 10 and between the seal member 130 and the base member 110 for an extended range of cable sizes. The quality of the seal can be made substantially consistent without regard for the size of the cable (within the prescribed range). The loading mechanism 160 allows for the seal member 130 to be customized to fit the cable 10. It is not necessary to mount a bushing, spacer or the like on the cable 10 in order to properly fit in the diameter of the cable to the channel 140. Cable of different sizes can be mounted in respective channels 140 of the seal member 130.

The security of the seal provided between the cable 10 and the seal member 130 can be augmented by the supplemental sealing pressure inducted by the loading mechanism 160. Accordingly, an improved seal can be provided to withstand greater pressure (e.g., water level).

The pressure applied to the cable 10 can be selectively set so that a good seal is provided, but the cable 10 is not overloaded or overcompressed. Such overloading may damage the cable 10, particularly in the case of optical fibers.

Cables can be inserted, removed, and re-inserted (the same or a different cable) into the channels 140. The loading mechanism 160 can be loosened to facilitate removal and re-insertion. Once re-inserted, the loading mechanism can be used to form an improved seal about the cable as described above.

According to some embodiments, other types of biasing members may be used in place of or in addition to a crest to crest continuous wave sprint. For example, the biasing member may include a coil spring, a Belleville washer, and elastomeric spring member, or a deformable containment structure (e.g., a bladder) filled with a compressible fluid. According to some embodiments, the biasing member includes a block of an elastomer. According to some embodiments, other types of seal members may be used. For, example, aspects of the present invention may be employed with seal members having nonbaffled passages and/or with non-elastomeric seal members (e.g., with a gel seal).

Figure 10:
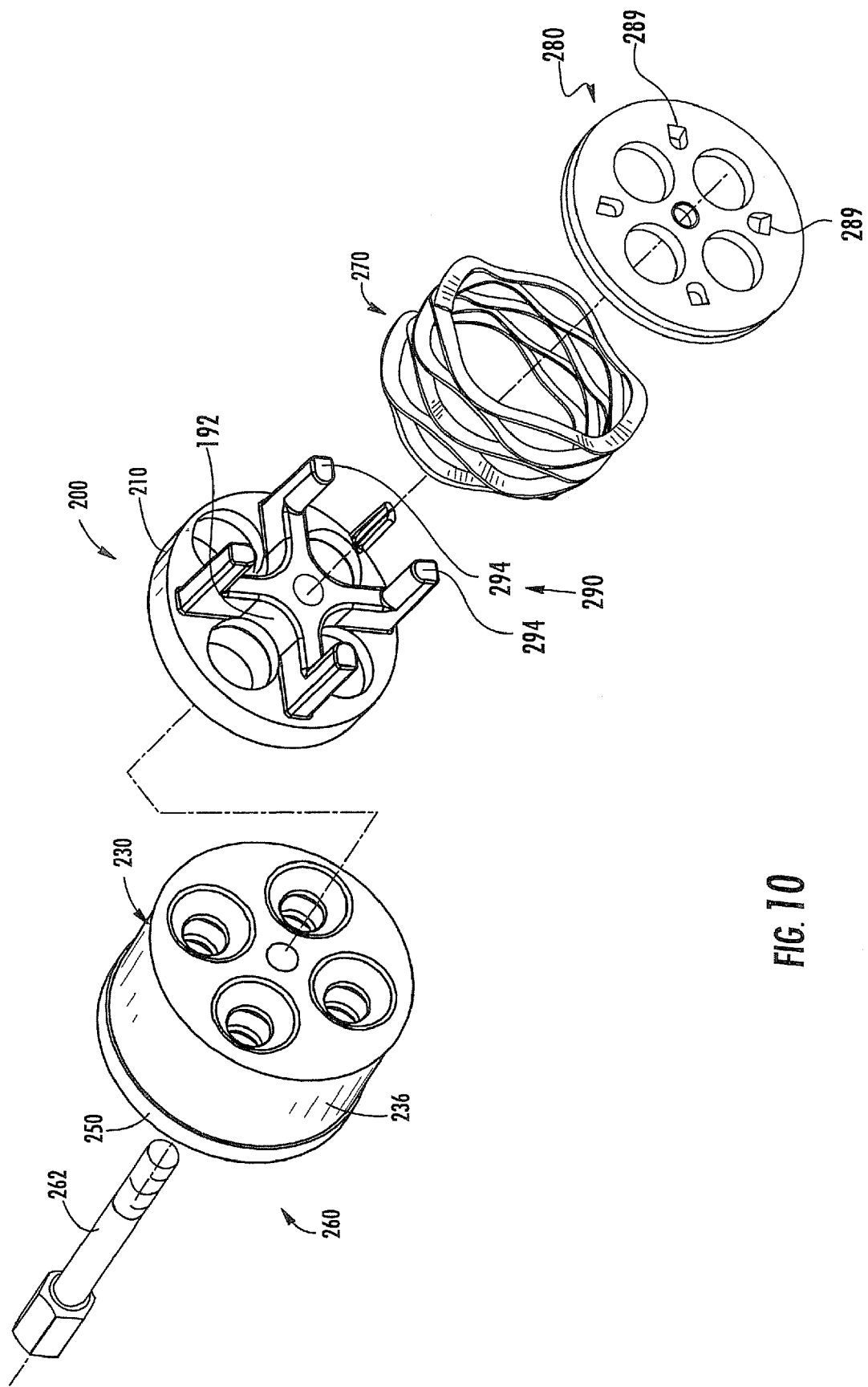
FIG. 10 is an exploded perspective view of a sealing assembly according to further embodiments of the present invention.

With reference to FIG. 10, a sealing assembly 200 according to further embodiments of the present is shown therein. The sealing assembly 200 includes a bolt 162, a spring plate 280 and a spring 270 corresponding to the bolt 162, the spring plate 180 and the spring 170. The sealing assembly 200 differs from the sealing assembly 100 in that the base member 110 is replace with a reduced base 210. The base member 210 includes a platform 292 and posts 294 corresponding to the platform 192 and the post 194 to provide, in combination with the holes 289 of the spring plate 280, an anti-rotation mechanism 290. Also, the pressure member 250 and the seal member 230 are round, although they may alternatively be polygonally or otherwise shaped. The sealing assembly 200 may be place in an opening of a duct (e.g., a tube), box or the like and used to seal about a cable or other elongate object as described a above, and also to form a seal between the sealing assembly 200 and the opening of the structure. More particularly, as the loading mechanism 260 is operated to axially compress the seal member 230, the outer surface 236 of the seal member 230 will bulge radially or laterally outwardly to form a seal with the opening of the receiving structure.

While a cable 10 has been described above for the purposes of illustration, it will be appreciated that other elongate articles or objects may be sealed as well. For example, the sealing assemblies 100 may be used to form seals about mini tubes (e.g., fiber optic mini tubes).

Various modifications may be made to the devices and methods described above. For example, the base member 110 may include more or fewer sealing subassemblies 101. Each sealing subassembly 101 may be provided with more or fewer passages to receive more or fewer cable or other elongate objects. The shapes of the passages 140 may be changed to complement cable or other elongate objects of other cross-sectional shapes (e.g., square, oval, etc.).

Other arrangements of threaded members may be employed to selectively displace the pressure member 150. For example, the bolt 162 and threaded spring plate hole 187 may be replaced with a bold or threaded post secured to the spring plate 180 that extends forwardly through the seal member 130 and the pressure member 150, and a nut mounted on the threaded post and arranged to apply a load to the pressure member 150. According to some embodiments, other mechanisms, including non-threaded mechanisms, may be used to adjustably load the pressure member 150 and the spring plate 180.

The foregoing is illustrative of the present invention and is not to be construed as limiting thereof. Although a few exemplary embodiments of this invention have bee described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the forgoing is illustrative of the present invention and is not to be construed as limited to the specific embodiments disclosed, and that modifications to the disclosed embodiments, as well as other embodiments, are intended to be included within the scope of the invention.

That which is claimed is:

1. A sealing assembly for forming a seal about an elongate object, the sealing assembly comprising:
   a) a resilient seal member including an inner wall surface defining a channel to receive the elongate object, the seal member having first and second opposed sides;
   b) a base member disposed on the second side of the seal member;
   c) a loading mechanism including:
      a first pressure member on the first side of the seal member;
      a second pressure member on the second side of the seal member and including a threaded portion;
      a biasing member on the second side of the seal member and interposed between the base member and the second pressure member; and
      an adjustable displacement mechanism including a threaded member that threadedly engages the threaded portion of the second pressure member and is rotatable relative to the base member and the second pressure member to axially displace the first and second pressure members relative to one another to selectively apply a compressive load to the seal member such that the inner wall surface is expanded inwardly to exert a sealing pressure on the elongate object; and
   d) an anti-rotation feature to limit rotation of the second pressure member relative to the base member while permitting relative axial displacement between the base member and the second pressure member.

2. The sealing assembly of claim 1 wherein the base member is interposed between the second side of the seal member and the biasing member.

3. The sealing assembly of claim 1 wherein:
   the base member includes a side wall and defines a cavity; and
   when the displacement mechanism applies the compressive load to the seal member, an outer surface of the seal member expands outwardly to form a seal with the side wall of the base member.

4. The sealing assembly of claim 1 wherein the biasing member is a crest to crest continuous wave spring.

5. The sealing assembly of claim 1 wherein the biasing member includes an elastomeric spring member.

6. The sealing assembly of claim 1 wherein the biasing member includes a deformable containment structure filled with a compressible fluid.

7. The sealing assembly of claim 1 wherein:
   the seal member includes a second inner wall surface defining a second channel to receive a second elongate object; and
   when the loading mechanism applies the compressive load to the seal member, the second inner wall surface is expanded inwardly to exert a sealing pressure on the second elongate object.

8. The sealing assembly of claim 1 wherein the threaded portion of the second pressure member is integrally formed with the second pressure member.

9. The sealing assembly of claim 1 wherein the seal member is formed of an elastomeric material.

10. The sealing assembly of claim 9 wherein the seal member is formed of a material having a durometer of at least as hard as about 10 Shore A.

11. A sealing assembly for forming a seal about an elongate object, the sealing assembly comprising:
   a) a resilient seal member including an inner wall surface defining a channel to receive the elongate object, the seal member having first and second opposed sides;
   b) a loading mechanism including:
      a first pressure member on the first side of the seal member;
      a second pressure member on the second side of the seal member;
      a biasing member on the second side of the seal member and interposed between the seal member and the second pressure member; and
      an adjustable displacement mechanism accessible and operable from the first side of the seal member to displace the first and second pressure members relative to one another to selectively apply a compressive load to the seal member such that the inner wall surface is expanded inwardly to exert a sealing pressure on the elongate object; and
   c) a base member interposed between the second side of the seal member and the biasing member, wherein the first and second pressure members are each axially displaceable relative to the base member;
   wherein the displacement mechanism includes a threaded member that is rotatable relative to the base member to axially converge the first and second pressure plates to apply the compressive load to the seal member; and
   wherein the sealing assembly includes an anti-rotation feature to limit rotation of the second pressure member relative to the base member while permitting relative axial displacement between the base member and the second pressure member, and wherein the second pressure member includes a threaded portion threadedly engaging the threaded member.

12. The sealing assembly of claim 11 wherein the threaded portion is integrally formed with the second pressure member.

13. The sealing assembly of claim 11 wherein the seal member is formed of an elastomeric material.

14. The sealing assembly of claim 13 wherein the seal member is formed of a material having a durometer of at least as hard as about 10 Shore A.

15. The sealing assembly of claim 11 wherein:
   the base member includes a side wall and defines a cavity; and
   when the displacement mechanism applies the compressive load to the seal member, an outer surface of the seal member expands outwardly to form a seal with the side wall of the base member.

16. The sealing assembly of claim 11 wherein the biasing member is a crest to crest continuous wave spring.

17. The sealing assembly of claim 11 wherein the biasing member includes an elastomeric spring member.

18. The sealing assembly of claim 11 wherein the biasing member includes a deformable containment structure filled with a compressible fluid.

19. The sealing assembly of claim 11 wherein:
the seal member includes a second inner wall surface defining a second channel to receive a second elongate object; and
when the loading mechanism applies the compressive load to the seal member, the second inner wall surface is expanded inwardly to exert a sealing pressure on the second elongate object.

* * * * *